US012809795B2

(12) United States Patent
Becht et al.

(10) Patent No.: US 12,809,795 B2
(45) Date of Patent: Nov. 24, 2026

(54) FEATURE MANAGEMENT FOR INPUT/OUTPUT (I/O) ADAPTERS

(71) Applicant: INTERNATIONAL BUSINESS MACHINES CORPORATION, Armonk, NY (US)

(72) Inventors: Michael James Becht, Poughkeepsie, NY (US); Pasquale A. Catalano, Wallkill, NY (US); Christopher J Colonna, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/636,867

(22) Filed: Apr. 16, 2024

(65) Prior Publication Data

US 2025/0321906 A1 Oct. 16, 2025

(51) Int. Cl.
*G06F 9/48* (2006.01)
*G06F 13/20* (2006.01)

(52) U.S. Cl.
CPC .......... *G06F 13/20* (2013.01); *G06F 2213/40* (2013.01)

(58) Field of Classification Search
None
See application file for complete search history.

(56) References Cited

U.S. PATENT DOCUMENTS 5,201,056 A * 4/1993 Daniel ................ G06F 9/30192 712/E9.035
6,029,092 A * 2/2000 Stein ......................... H02J 3/14 700/291
9,767,409 B1 * 9/2017 Makhijani ................ G06N 3/09
10,356,128 B1 7/2019 Lango et al.
10,614,005 B1 * 4/2020 Villano ................... G06F 13/20
10,764,333 B2 9/2020 Nagarkar
10,999,328 B2 5/2021 Lango et al.
11,610,273 B2 3/2023 Lyle
2004/0083291 A1 * 4/2004 Pessi ................... H04L 65/1083 709/227
2005/0246460 A1 * 11/2005 Stufflebeam ........ G06F 13/4022 710/104
2008/0209099 A1 * 8/2008 Kloeppner .......... G06F 13/4022 710/314
2010/0169483 A1 * 7/2010 Jalkanen ............. H04L 65/1016 709/227
2013/0198430 A1 * 8/2013 Chu .......................... G06F 1/12 710/301

(Continued)

OTHER PUBLICATIONS

Alom et al., "BlockMeter: An Application Agnostic Performance Measurement Framework For Private Blockchain Platforms," Published in: IEEE Transactions on Services Computing (vol. 16, Issue: 6, Nov.-Dec. 2023), DOI: 10.1109/TSC.2023.3293724, Date of Publication: Jul. 13, 2017, 17 pages.

(Continued)

*Primary Examiner* — Hyun Nam
(74) *Attorney, Agent, or Firm* — Onyx IP Group

(57) ABSTRACT

Feature management for I/O adapters includes receiving an instruction for an I/O operation, the instruction including a feature tag indicating a feature related to an I/O adapter capability; and routing, based on the feature tag and information describing a plurality of I/O adapters, the I/O operation to an I/O adapter enabled with the feature.

20 Claims, 6 Drawing Sheets

(56) References Cited

U.S. PATENT DOCUMENTS

| | | | | |
|---|---|---|---|---|
| 2017/0249292 | A1* | 8/2017 | Constable | G06F 40/205 |
| 2019/0141107 | A1* | 5/2019 | Antsev | H04M 11/066 |
| 2021/0051229 | A1* | 2/2021 | Buckley | H04L 51/066 |
| 2021/0342280 | A1* | 11/2021 | McDaniel | G06F 13/20 |
| 2024/0289262 | A1* | 8/2024 | Zhu | G06F 11/3688 |
| 2025/0181538 | A1* | 6/2025 | Jin | G06F 11/0757 |
| 2026/0072788 | A1* | 3/2026 | Jeon | G06F 11/1068 |
| 2026/0111385 | A1* | 4/2026 | Guo | G06F 13/4081 |

OTHER PUBLICATIONS

Anonymous, "Dynamic Network Function Virtualization Management Systems and Methods," an IP.com Prior Art Database Technical Disclosure, IP.com No. IPCOM000246625D, IP.com Electronic Publication Date: Jun. 22, 2016, 12 pages.

Anonymous, "Method for Policy Based Selection and Allocation of Storage Adapters in a VM," an IP.com Prior Art Database Technical Disclosure, IP.com No. IPCOM000266783D, IP.com Electronic Publication Date: Aug. 19, 2021, 4 pages.

Anonymous, "Netconf software generic adapter to monitor NETCONF protocol enabled devices," an IP.com Prior Art Database Technical Disclosure, IP.com No. IPCOM000266320D, IP.com Electronic Publication Date: Jul. 1, 2021, 7 pages.

Anonymous, "Software Defined Network Adapter/Network Interface Controller for Increased Throughput and Processor Offloading," an IP.com Prior Art Database Technical Disclosure, IP.com No. IPCOM000246222D, IP.com Electronic Publication Date: May 17, 2016, 7 pages.

Chowdhury et al., "Rank-LIME: Local Model-Agnostic Feature Attribution for Learning to Rank," ICTIR '23: Proceedings of the 2023 ACM SIGIR International Conference on Theory of Information Retrieval, DOI: https://doi.org/10.1145/3578337.3605138, Published: Aug. 3, 2023, 5 pages.

Wu et al., "Algorithmic Stability and Generalization of an Unsupervised Feature Selection Algorithm," 35th Conference on Neural Information Processing Systems (NeurIPS 2021), DOI: https://doi.org/10.48550/arXiv.2010.0941, Dec. 6, 2021, 16 pages.

Yang et al., "Shuffle-Then-Assemble: Learning Object-Agnostic Visual Relationship Features," Proceedings of the European Conference on Computer Vision (ECCV), 2018, 15th European Conference, Munich, Germany, Sep. 8-14, 2018, DOI: https://doi.org/10.1007/978-3-030-01258-8_3, Published: Sep. 8, 2018, 17 pages.

* cited by examiner

FEATURE MANAGEMENT FOR INPUT/OUTPUT (I/O) ADAPTERS

BACKGROUND

The present disclosure relates to methods, apparatus, and products for feature management for I/O adapters. In particular, the present disclosure relates to routing I/O operations among various I/O adapters.

SUMMARY

According to embodiments of the present disclosure, various methods, apparatus and products for feature management for I/O adapters are described herein. In some aspects, feature management for I/O adapters includes receiving an instruction for an I/O operation, where the instruction includes a feature tag indicating a feature related to an I/O adapter capability. Using the feature tag and information describing a plurality of I/O adapters, the I/O operation is routed to an I/O adapter enabled with the feature.

DETAILED DESCRIPTION

Computing systems are often upgraded with new I/O adapters while retaining the legacy I/O adapters, or legacy I/O adapters are carried over from one computing system to a new computing system. It is often the case that the upgraded I/O adapter and legacy I/O adapter perform the same basic functionality, with the upgraded I/O adapter providing new or enhanced features. In such cases, it is cost effective to retain the legacy I/O adapter and use the upgraded I/O adapter when the enhanced features are desirable for a particular I/O operation. Accordingly, embodiments of the present disclosure provide a mechanism for routing I/O operations to I/O adapters based on the adapter's capability to provide a needed or preferred feature associated with the I/O operation. A feature tag associated with an I/O operation is mapped to I/O adapters that are enabled with the feature corresponding to the feature tag. An I/O processor selects an I/O adapter to perform the I/O operation based on the feature.

Figure 1:
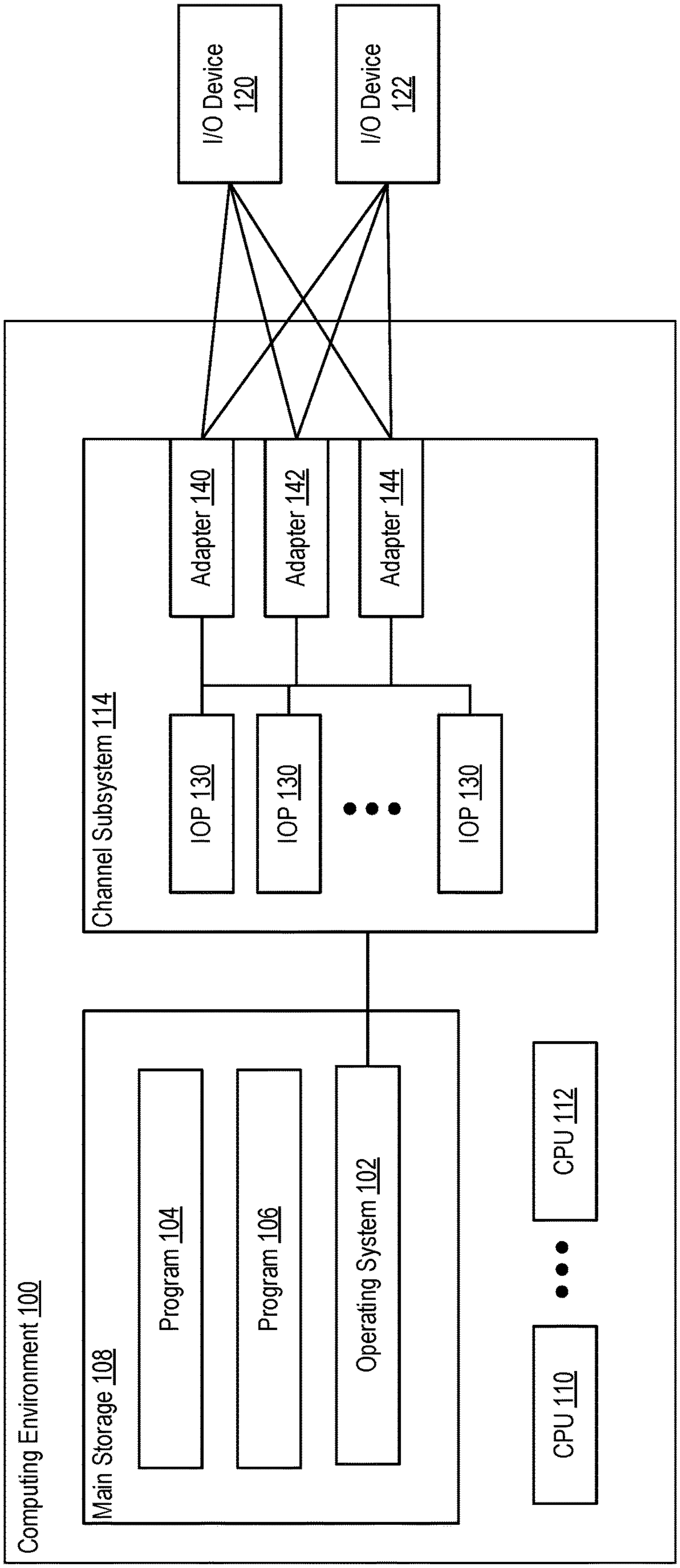
FIG. 1 sets forth sets forth an example of a computing environment for feature management for I/O adapters in accordance with at least one embodiment of the present disclosure.

With reference now to FIG. 1, FIG. 1 sets forth an example computing environment 100 for feature management for I/O adapters in accordance with at least one embodiment of the present disclosure. The example computing environment 100 is consistent with the z/Architecture provided by International Business Machines. The example computing environment includes main storage 108 that includes address spaces for executing one or more user programs 104, 106 and an operation system (OS) 102. The example computing environment 100 also includes one or more central processing units (CPUs) 110, 112 that execute the programs 104, 106 and OS 102. The example computing environment 100 also includes one or I/O devices 120, 122. The I/O device 120, 122 can be, for example, storage devices, printers, other computing environments, and so on. The terms 'input' and 'output' are used to describe the transfer of data between I/O devices 120, 122 and main storage 108. Thus, an operation involving the transfer of data from a program executing in main storage 108 to an external I/O device 120, 122 is referred to as an I/O operation.

In accordance with some aspects, the facilities used to control I/O operations are collectively called the channel subsystem 114, which directs the flow of data between I/O devices 120, 122 and main storage 108. By interceding between the CPUs 110, 112 executing a program and the I/O devices 120, 122 used by that program, the channel subsystem 114 permits data processing on the system processors to proceed concurrently with I/O processing in the channel subsystem 114. The channel subsystem 114 selects one or more channel paths using a channel path ID (CHPID) as the communication link in managing the flow of information to or from I/O devices.

Within the channel subsystem 114 are subchannels dedicated to each I/O device accessible to the program through the channel subsystem 114. Each subchannel provides information concerning the associated I/O device and its attachment to the channel subsystem 114. I/O devices are attached through control units to the channel subsystem 114 by means of channel paths. Control units may be attached to the channel subsystem 114 by more than one channel path, and an I/O device may be attached to more than one control unit. Further, channel paths may be provided with different data-transfer capabilities. As part of I/O processing, the channel subsystem 114 also performs channel-path selection and channel-path management functions, such as testing for channel-path availability, selecting an available channel path, and initiating execution of I/O operations over the selected channel path with the attached I/O devices. When I/O operations are completed, the channel subsystem 114 analyzes the resulting status and transmits it back to the program by use of I/O interrupts and I/O status information.

In some aspects, the channel subsystem 114 contains common facilities for the control of I/O operations. These facilities may be provided in the form of separate, autonomous equipment designed specifically to control I/O devices, allowing I/O operations to be completely overlapped with the activity in CPUs. After I/O processing at the subchannel has been requested by the execution of 'start subchannel' (SSCH) instruction, the CPU is released for other work, and the channel subsystem 114 assembles or disassembles data and synchronizes the transfer of data bytes between the I/O device and main storage. A Subsystem Identification Word (SID) identifies the target subchannel associated with a specific I/O device. For example, the Start Subchannel (SSCH) instruction that is used to initiate an I/O operation with a specific I/O device requires an SID operand as the means for identifying the subchannel that is used to access the associated device.

In some aspects, the channel subsystem 114 comprises the hardware and firmware required to implement the channel architecture, including all of the different types of channel paths provided by the system. The firmware includes dedicated asynchronous I/O processors (IOPs) 130, which are also referred to as system assist processors (SAPs), and I/O channel paths performs the bulk of the I/O instructions as well as I/O interrupt processing. The IOPs 130 take responsibility during the execution of an I/O operation and relieve the OS (and thus CPU involvement) during the orchestration of an I/O operation. For example, the IOP 130 schedules I/O, finds an available channel path to the device, and guarantees that the I/O operation starts. In some implementations, an IOP 130 processes the start-subchannel (SSCH) instruction, locates a subchannel or logical device in its work queue, locates an available channel that succeeds in connecting to a control unit, then starts the I/O operation. The IOP 130 uses information in the subchannel to determine which channels and control units can be used to reach the target I/O device 120, 122.

In some implementations, to maintain information about the I/O configuration, a set of control blocks are allocated in a Hardware System Area (HSA) of main storage 108 that is accessible only to the channel subsystem 114 firmware. One class of control block in HSA is the subchannel control block (SCB) and contains information used to represent an architected subchannel and contains information required to communicate with the associated I/O device. For example, SCB contains information such as the channel program address, path selection controls, the device address, subchannel and device status. There may be additional control blocks used to manage I/O operations with the channels, queuing of work, managing interruptions, and so on.

The channel subsystem 114 includes more than one type of channel path. Different types of channel paths can include Enterprise Connectivity (ESCON), Fiber Connectivity (FICON), and Open Systems Adapter (OSA), which can provide industry-standard connectivity through local area networks (LANs) and wide area networks (WANs). The physical interconnect for the channel paths is an I/O card, referred to herein as an I/O adapter 140, 142, 144. An adapter can include multiple ports, each associated with a physical channel path identifier. Through these ports, an adapter can provide a path to an I/O device through multiple channel paths, and can provide multiple channel paths to multiple I/O devices. Similarly, multiple adapters can provide multiple channel paths to the same I/O device. As part of path selection, the IOP selects a channel path corresponding to the type of adapter needed to execute the I/O operation using a physical channel path identifier. Relevant to this disclosure, there may be multiple adapters that can execute a particular I/O operation. For example, there may be multiple PCIe adapters that can execute a given I/O operation to transfer data to an I/O device such as a storage system.

As the computing environment 100 is upgraded, new adapters may be installed along with existing legacy adapters. For example, a new adapter may have faster data transfer rates or may include additional enhanced features beyond those of a legacy adapter. However, the legacy adapter may retain sufficient operability to execute many I/O operations and thus removal and replacement of the legacy adapter is not warranted. To illustrate, the example computing system of FIG. 1 includes multiple adapters 140, 142, 144 of the same adapter type that provide redundant channel paths to the same I/O device 120 but differ in the features that they provide.

In some examples, the adapters 140, 142, 144 may differ in the security features they provide, where one or more of the adapters includes security enhancement features that are not provided by some of the other adapters. These enhancements can include enhanced or new security levels, enhanced or new encryption algorithms, enhanced or new security options enabled, or features that permit compliance with new security policies. In one example, a particular adapter may include a security processor that is capable of quantum-safe key exchange. As one illustrative example, adapter 142 may provide enhanced cryptographic features (e.g., quantum-safe encryption algorithms, large key sizes), whereas adapter 140 provides legacy cryptographic features (e.g., older encryption algorithms, smaller key sizes, etc.). In some examples, these different security features are represented by different feature codes associated with the adapter.

In some examples, the adapters 140, 142, 144 may differ in their support for artificial intelligence ('AI') workload I/O operations, where one or more of the adapters includes AI enhancement features that are not provided by some of the other adapters. These AI features can include hardware or firmware enhancements provided in the adapter that optimize I/O operations for AI workloads. In some examples, AI features are represented by different feature codes associated with the adapter.

In some examples, the adapters 140, 142, 144 may differ in their support for data compression, where one or more of the adapters includes data compression features that are not provided by some of the other adapters. For example, these data compression features can include hardware or firmware enhancements provided in the adapter that provide increased data compression. In some examples, data compression features are represented by different feature codes associated with the adapter.

In some examples, the adapters 140, 142, 144 may differ in their support for connectivity features, where one or more of the adapters includes connectivity features that are not provided by some of the other adapters. For example, these connectivity features can include hardware or firmware support for remote direct memory addressing (RDMA) over Converged Ethernet (RoCE). In some examples, connectivity features are represented by different feature codes associated with the adapter.

In some examples, the adapters 140, 142, 144 may differ in data transfer throughput (i.e. speed), where one or more of the adapters is faster than some of the other adapters. In some examples, adapter speeds are represented by different feature codes associated with the adapter.

In some implementations, the features provided by an adapter are stored in data structure that is accessible by the IOP 130. For example, the data structure can include feature codes associated with an adapter. In various implementations, the features can be added by a discovery utility that reads information stored on the adapter, or the features can be added manually by a technician that installs the adapter in the computing environment 100. In some examples, the features are enumerated in a control block that is associated with the adapter. For example, the control block may be stored in the HSA.

In some examples, when the OS 102 receives an I/O request from an executing program, the OS 102 determines a feature that is associated with the I/O request. For example, the I/O request may be in the form of a function call to the OS 102 and information relating to a particular feature can be passed as a parameter of the call. In another example, the OS 102 can infer that a feature is associated with the request based on the nature of the program or other information describing the program such as a task control block (TCB). In some implementations, once the OS 102 identifies that a feature is associated with an I/O request, the OS 102 determines whether the feature is a required feature. For example, the I/O request may indicate whether the request feature is a required feature. Based on determining that a feature is associated with an I/O request and whether the feature is a required feature, the OS 102 generates an I/O instruction that includes a feature tag. The OS 102 dispatches the I/O instruction containing a feature tag to the channel subsystem 114. The feature tag indicates the feature and may also indicate whether the feature is a required feature. In a particular example, a required feature is indicated by a first bit mask in the I/O instruction and an optional feature (i.e., a feature that is requested by not required) is indicated by a second bit mask. In another example, the feature tag is a pointer to a feature in a list of features of a data structure stored, for example, in the HSA in main storage. The I/O instruction that includes the feature tag can be, for example, the Start-Subchannel (SSCH) instruction.

In some examples, the I/O instruction is received by an IOP 130 in the channel subsystem 114 from the OS 102. The IOP 130 schedules the I/O operation in response to the I/O instruction by selecting a channel path. In a typical operation where no feature is designated, the IOP may select channel paths among available adapters for the type of I/O request using round robin or based on availability or busyness factors such as queue length. However, in accordance with embodiments of the present disclosure, the IOP 130 selects a channel path based on the feature tag in the I/O instruction and the features provided by the available adapters for the I/O type. The IOP 130 determines, from the feature tag of the I/O instruction, whether a feature is associated with the I/O instruction. The IOP 130 also determines whether the feature is a required feature. For example, the IOP 130 may identify the feature and whether it is a required feature by applying a bit mask to the I/O instruction. Based on the identification of the feature, the IOP 130 determines which adapters 140, 142, 144, if any, provide the feature. For example, the IOP 130 may access one or more control blocks (e.g., in HSA) or other data structures that identify the features associated with the adapters 140, 142, 144. As one example, one or more data structures may list feature codes associated with the adapters 140, 142, 144, and the IOP 130 maps the requested feature to these feature codes. Based on mapping the requested feature to the features provided by the adapters 140, 142, 144, the IOP 130 selects a particular adapter for scheduling the I/O operation. If the feature is identified as a required feature, the IOP 130 selects an adapter that provides that feature. In some examples, if the feature is not a required feature, the IOP 130 makes a best effort to schedule the I/O operation on an adapter that provides the feature in consideration of other factors such as availability and load balancing among the channel paths. Once a channel path has been selected, the adapter 140, 142, 144 performs the I/O operation in accordance with the requested feature.

To aid illustration, consider an example where an executing program 104 issues a call to the OS 102 to write data to I/O device 120 using quantum-safe encryption. The OS 102 determines based on this call that a quantum-safe encryption algorithm is a required feature to perform the I/O operation. The OS 102 issues an I/O instruction to the channel subsystem 114, the instruction identifying the I/O device and also identifying quantum-safe encryption as a required feature. The IOP 130 receives the I/O instruction and uses a bit mask to identify that quantum-safe encryption is a required feature. In this example, consider that adapter 140 and adapter 142 provide security features but not quantum-safe encryption. That is, adapter 140 and adapter 142 are legacy adapters that, although providing enhanced security, do not provide quantum-safe encryption. These adapters may have been retained because they provide sufficient security in most instances. Based on identifying that quantum-safe encryption is a required feature, the IOP 130 accesses a data structure describing features of the adapters to identify which adapters 140, 142, 144 provide the feature. Based on the feature information in the data structure, the IOP selects a channel path belonging to adapter 144, which is the only adapter that provides quantum-safe encryption.

In alternative scenario, consider an example where the executing program 104 issues a call to the OS 102 to write data to I/O device 120 preferably using quantum-safe encryption. The OS 102 determines based on this call that quantum-safe encryption is a requested optional feature to perform the I/O operation. The OS 102 issues an I/O instruction to the channel subsystem 114, the instruction identifying the I/O device and also identifying quantum-safe encryption as a feature but not a required feature. In this example, consider that adapter 144, being the only adapter that supports quantum-safe encryption, is oversubscribed. Given that quantum-safe encryption is not a required feature of the I/O operation, the IOP 130 selects another adapter 140, 142 that is not oversubscribed and schedules the I/O operation on that adapter. For example, the IOP 130 may select a channel path belonging to adapter 140 or adapter 142 based on round robin. In some examples, the IOP 130 selects a 'next-best' adapter based on the features provided by the adapter and enumerated in the control block. For example, adapter 142 might provide enhanced encryption that is not quantum-safe, whereas adapter 140 provides no special cryptographic capabilities. In such a case, the IOP 130 may select a channel path of adapter 142 for scheduling the I/O operation.

In yet another alternative scenario, the IOP 130 may determine that quantum-safe encryption is a required feature but one that is not provided by any of the installed adapters 140, 142, 144. In such a case, the IOP 130 or channel subsystem 114 may log the occurrence to indicate that a feature was required but could not be provided to the requestor. Such information could be used by administrative personnel to identify when an adapter upgrade should be performed.

Although the above has been described in the context of the IBM z/Architecture computing environment, it will be appreciated that adapter selection based on a feature tag of an I/O operation may be generalized to any computing environment. That is adapter selection based on a feature tag of an I/O operation, as performed by the IOP 130 in the example above, can be carried out by an I/O path controller, channel selector, bus controller, adapter supervisor, or any other entity that mediates I/O requests between an operating system and the I/O adapters installed in the system. Such an entity can be implemented in digital logic, embodied in firmware, or stored as processor-executable instructions.

Figure 2:
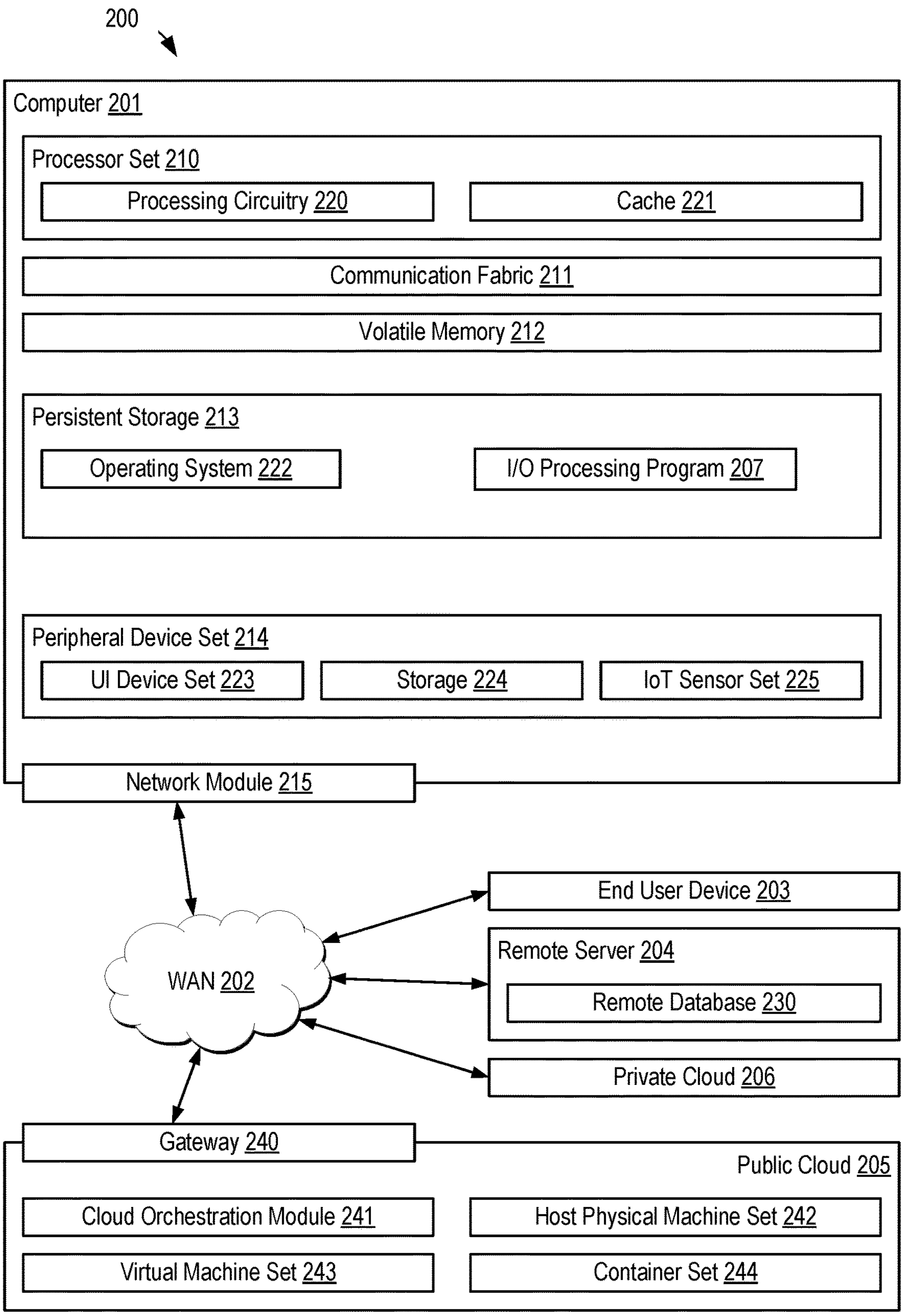
FIG. 2 sets forth another example of a computing environment according to aspects of the present disclosure.

FIG. 2 sets forth an example computing environment according to aspects of the present disclosure. Computing environment 200 contains an example of an environment for the execution of at least some of the computer code involved in performing the various methods described herein, such as I/O processor program 207. In addition to I/O processor program 207, computing environment 200 includes, for example, computer 201, wide area network (WAN) 202, end user device (EUD) 203, remote server 204, public cloud 205, and private cloud 206. In this embodiment, computer 201 includes processor set 210 (including processing circuitry 220 and cache 221), communication fabric 211, volatile memory 212, persistent storage 213 (including operating system 222 and I/O processor program 207, as identified above), peripheral device set 214 (including user interface (UI) device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 221 and the other storage media discussed below. The program instructions, and associated data, are accessed by processor set 210 to control and direct performance of the computer-implemented methods. In computing environment 200, at least some of the instructions for performing the computer-implemented methods may be stored in I/O processor program 207 in persistent storage 213.

Communication fabric 211 is the signal conduction path that allows the various components of computer 201 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface-type operating systems that employ a kernel. The code included in I/O processor program 207 typically includes at least some of the computer code involved in performing the computer-implemented methods described herein.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database), this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the computer-implemented methods can typically be downloaded to computer 201 from an external computer or external storage device through a network adapter card or network interface included in network module 215.

WAN 202 is any wide area network (for example, the internet) capable of communicating computer data over non-local distances by any technology for communicating computer data, now known or to be developed in the future. In some embodiments, the WAN 202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3:
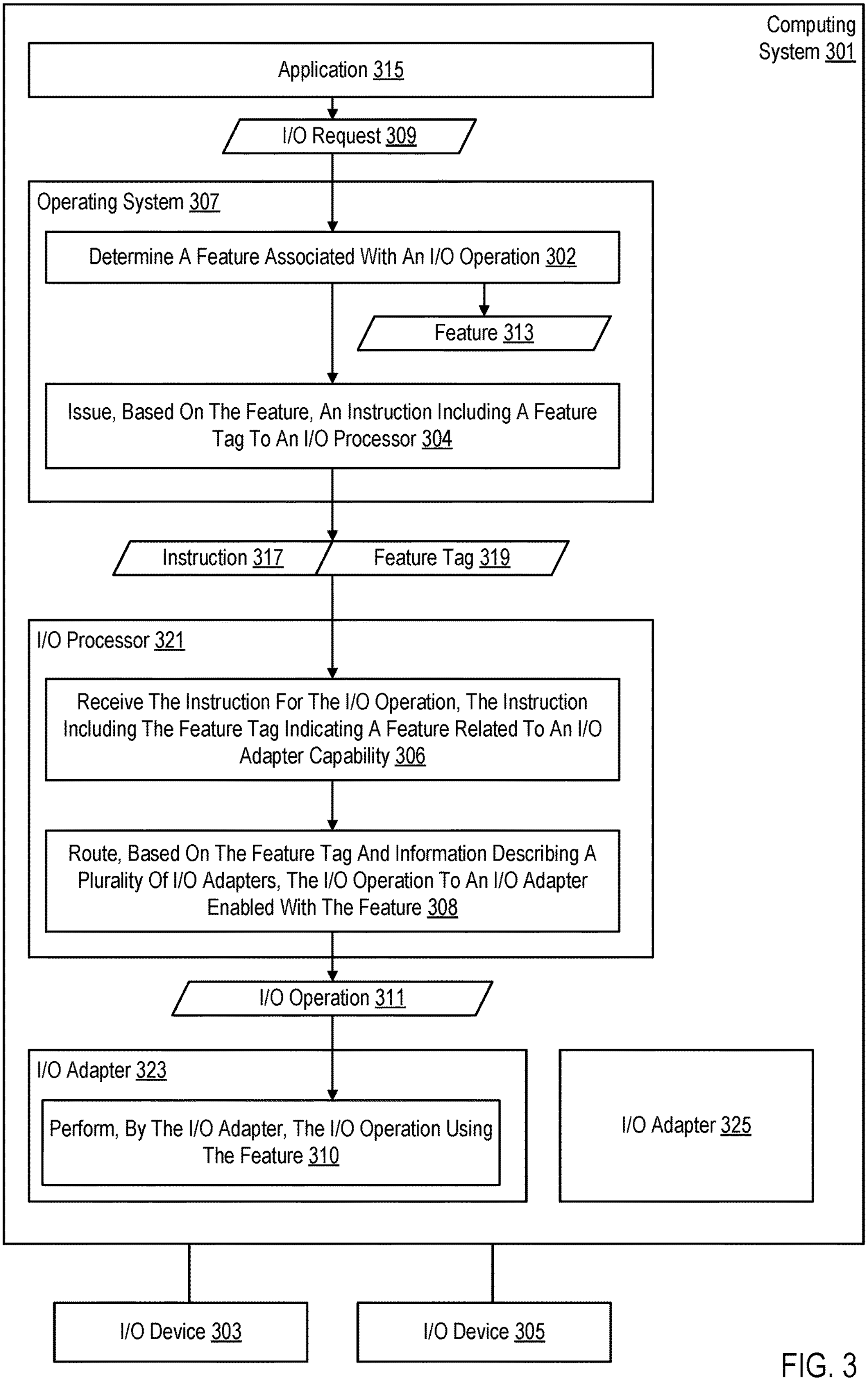
FIG. 3 sets forth a flow chart of an example method of feature management for I/O adapters in accordance with at least one embodiment of the present disclosure.

For further explanation, FIG. 3 sets forth a flow chart of an example method of feature management for I/O adapters in accordance with at least one embodiment of the present disclosure. The example of FIG. 3 includes a computing system 301 and two or more I/O devices 303, 305. For purposes of illustration, at least one I/O adapter 323 is enabled with a particular feature (e.g., a security processor) and at least one I/O adapter 325 is not enabled with the particular feature. The computing system also includes an operating system 307 and at least one I/O processor 321. The I/O processor 321 may be implemented in digital logic, embedded in firmware, stored on the computer system 301 as computer-executable instructions, or combinations thereof. At least one application 315 executes on the computing system 301. In some examples, the application 315 executes on one or more processors that are separate from the hardware implementing the I/O processor 321, which relieves the processors executing the application 315 of scheduling I/O operations.

The method of FIG. 3 includes determining 302, by the operating system 307 a feature 313 associated with an I/O operation 311. In some examples, the operating system 307 determines 302 the feature 313 associated with the I/O operation 311 based on information included with a request 309 from an application 315 that initiates the I/O operation 311. For example, the application 315 may include the feature as a parameter of a function call to the operation system 307. In some examples, the operating system 307 provides an API for receiving requests for I/O operations and features to be utilized in performing the I/O operation 311.

The method of FIG. 3 also includes issuing 304, by the operating system 307 based on the feature 313, the instruction 317 including a feature tag 319 to an I/O processor 321. In some examples, the operating system 307 issues 304 the instruction 317 with the feature tag 319 by determining the feature tag associated with the feature 313. In some implementations, information describing features of I/O capabilities of the computing system 301 is stored in a data structure that is accessible to the operating system 307. In these implementations, each feature may be associated with a feature identifier. For example, a list of features may be embodied in a control block that is stored in an HSA of main storage. In some variations, the feature tag includes the feature identifier; in such implementations, the operating system 307 issues 304 the instruction 317 by generating the instruction to represent the feature identifier in a bit mask. In other variations, the feature tag includes a pointer to a feature entry in a table of I/O capabilities of the computing system 301; in such implementations, the operating system 307 issues 304 the instruction 317 by generating the instruction to include this pointer to the feature entry in the table of I/O capabilities. The operating system 307 then transmits the instruction 317 to the I/O processor 321. In some implementations, operating system 307 is then relieve of any further handling of the I/O operation.

The method of FIG. 3 also includes receiving 306 the instruction 317 for the I/O operation 311, the instruction 317 including the feature tag 319 indicating a feature 313 related to an I/O adapter capability. In some examples, in response to receiving 306 the instruction 317 for the I/O operation 311, the I/O processor 321 inspects the instruction for the presence of a feature tag. If no feature tag is present, the I/O processor 321 routes the I/O operation to an I/O adapter based on a typical mechanism. For example, the I/O processor 321 may route the I/O operation to any available I/O adapter 323, 325, the least busy I/O adapter (e.g., shortest work queue length), and so on. In some implementations, if no feature tag is present, the I/O processor routes the I/O operation to a legacy I/O adapter 325 to free up the newer I/O adapters 323 for handling I/O operations that require enhanced features.

If a feature tag is present, the I/O processor 321 identifies the feature 313 corresponding to the feature tag 319. For example, the feature tag may be a bit mask from which the requested feature is identified. In another example, the feature tag may include a pointer to an entry in a table of features. The feature tag 319 may indicate whether the feature required or not required.

The method of FIG. 3 also includes routing 308, based on the feature tag 319 and information describing a plurality of I/O adapters 323, 325, the I/O operation 311 to an I/O adapter 323 enabled with the feature 313. In some examples, the I/O processor 321 routes 308 the I/O operation 311 by identifying all of the I/O adapters 323 that are enabled with the feature 313. For example, the I/O processor 321 may use the feature tag 319 to index into a data structure (e.g., a control block) describing features enabled on each I/O adapter 323, 325. For example, the information describing the I/O adapters may include a list of feature codes associated with each I/O adapter. Continuing the above example, where the feature 313 is a particular security feature (e.g., quantum-safe encryption), the information describing the I/O adapters may list this security feature as an I/O capability of I/O adapter 323, whereas the information describing the I/O adapters would not list this security feature as an I/O capability of I/O adapter 325. Where the feature tag 319 indicates this particular security feature, the I/O processor 321 would select I/O adapter 323 for performing the I/O operation 311. It will be appreciated that adapter 325 is also capable of performing the I/O operation 311, but cannot perform the I/O operation 311 using the requested feature. Upon identifying the I/O adapter 323 enabled with the feature 313, the I/O processor 321 routes 308 the I/O operation by, for example, scheduling the I/O operation 311 on the I/O adapter 323. The he I/O processor 321 may insert the I/O operation 311 as a work item in a queue of the I/O adapter 323.

The method of FIG. 3 also includes performing 310, by the I/O adapter 323, the I/O operation 311 using the feature 313. In some examples, the I/O adapter 323 performs 310 the I/O operation 311 by orchestrating the transfer of data between a data space of the application 315 and an I/O device 303 using the requested feature 313. For example, the I/O adapter 323 may orchestrate the transfer of data by negotiating with the I/O device 303 for the transfer of data. In negotiating with the I/O device 303, the I/O adapter 323 may negotiate a connection that uses the feature 313. For example, the I/O adapter 323 may negotiate a connection that uses an enhanced security feature (e.g., an encryption mechanism), enhanced support for an AI workload data exchange, an enhanced compression mechanism, an enhanced connectivity mechanism (e.g. RoCE), and the like.

Figure 4:
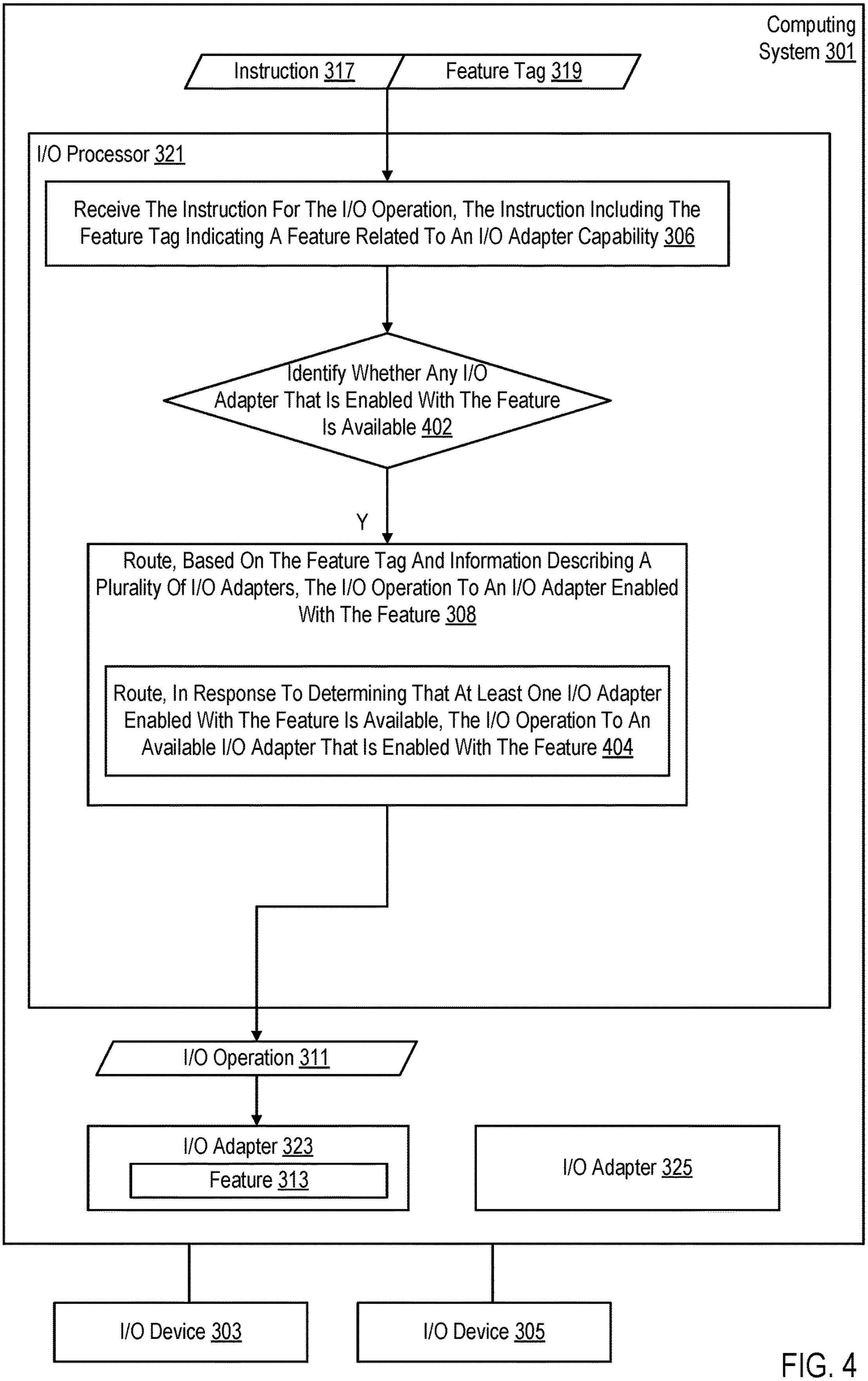
FIG. 4 sets forth a flow chart of an example method of feature management for I/O adapters in accordance with at least one embodiment of the present disclosure.

For further explanation, FIG. 4 sets forth a flow chart of an example method of feature management for I/O adapters in accordance with at least one embodiment of the present disclosure. The method of FIG. 4 extends the method of FIG. 3 in that the method of FIG. 4 also includes identifying 402 whether any I/O adapter 323 that is enabled with the feature is available. In some examples, the I/O processor 321 identifies 402 whether any I/O adapter 323 that is enabled with the feature is available by inspecting the work queues of the I/O adapters 323 that are enabled with the feature. For example, the I/O processor 321 may determine that an adapter is unavailable if the number of work items in the adapter's work queue exceeds a particular threshold or if the adapter's work queue is full.

In the method of FIG. 4, routing 308, based on the feature tag 319 and information describing a plurality of I/O adapters 323, 325, the I/O operation 311 to an I/O adapter 323 enabled with the feature 313 includes routing 404, in response to determining that at least one I/O adapter 323 enabled with the feature is available, the I/O operation 311 to an available I/O adapter 323 that is enabled with the feature. Upon determining that I/O adapter 323 is both enabled with the feature 313 and available, the I/O processor 321 routes the I/O operation 311 to I/O adapter 323.

Figure 5:
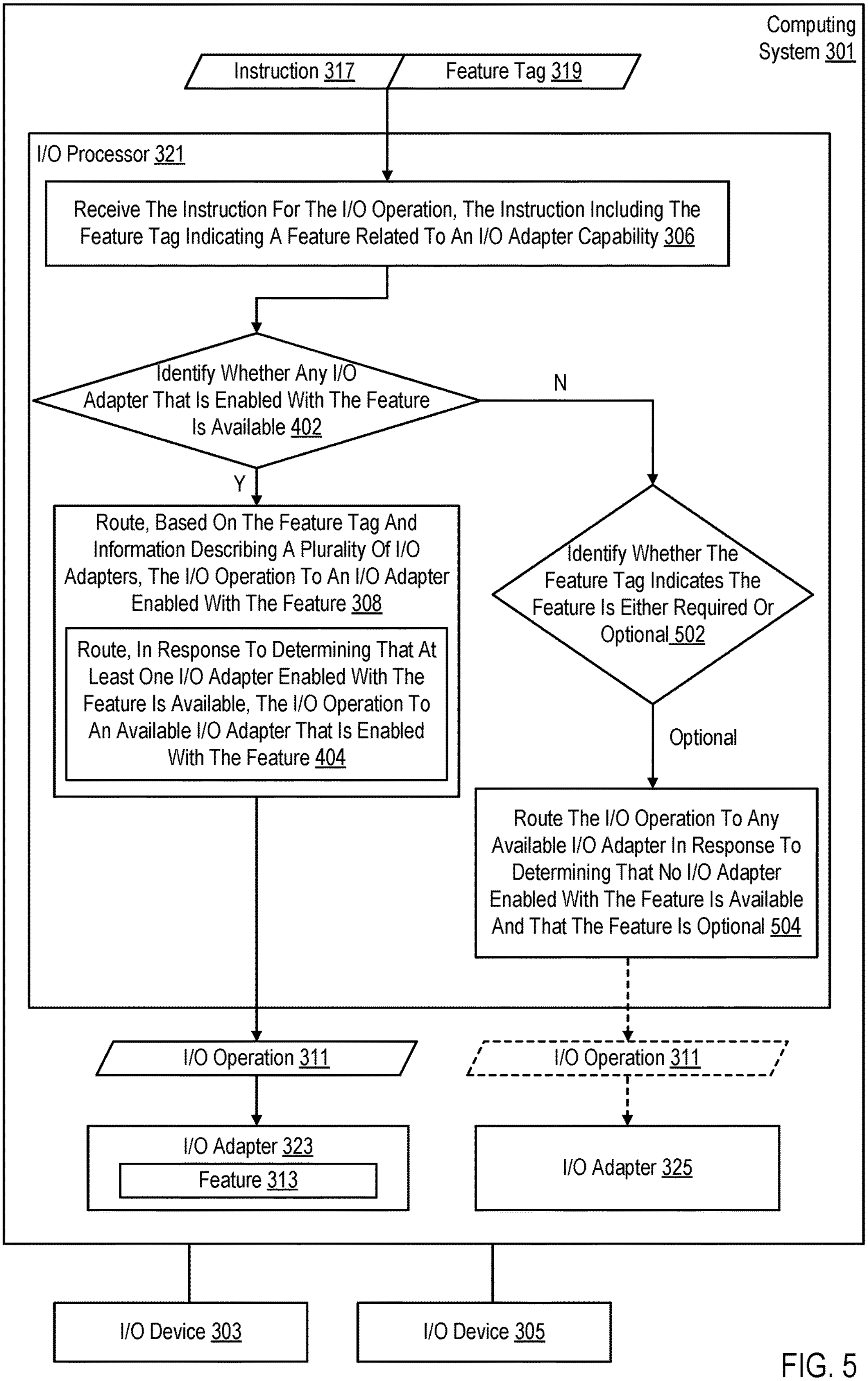
FIG. 5 sets forth a flow chart of an example method of feature management for I/O adapters in accordance with at least one embodiment of the present disclosure.

For further explanation, FIG. 5 sets forth a flow chart of an example method of feature management for I/O adapters in accordance with at least one embodiment of the present disclosure. The method of FIG. 5 extends the method of FIG. 4 in that the method of FIG. 5 also includes identifying 502 whether the feature tag 319 indicates the feature is either required or optional. As discussed above, the feature tag 319 indicates the feature 313 and whether the feature 313 is required or requested but not required (i.e., optional). In response to determining that no I/O adapter 323 enabled with the feature 313 is available, the I/O processor 321 identifies whether the feature 313 is required or requested but not required from the feature tag 319.

The method of FIG. 5 also includes routing 504 the I/O operation 311 to any available I/O adapter 325 in response to determining that no I/O adapter 323 enabled with the feature is available and that the feature 313 is optional. If the feature 313 is optional and an I/O adapter 323 enabled with the feature 313 is not available to perform the I/O operation 311, the I/O processor 321 routes the I/O operation normally, such as routing the I/O operation based on adapter availability.

Figure 6:
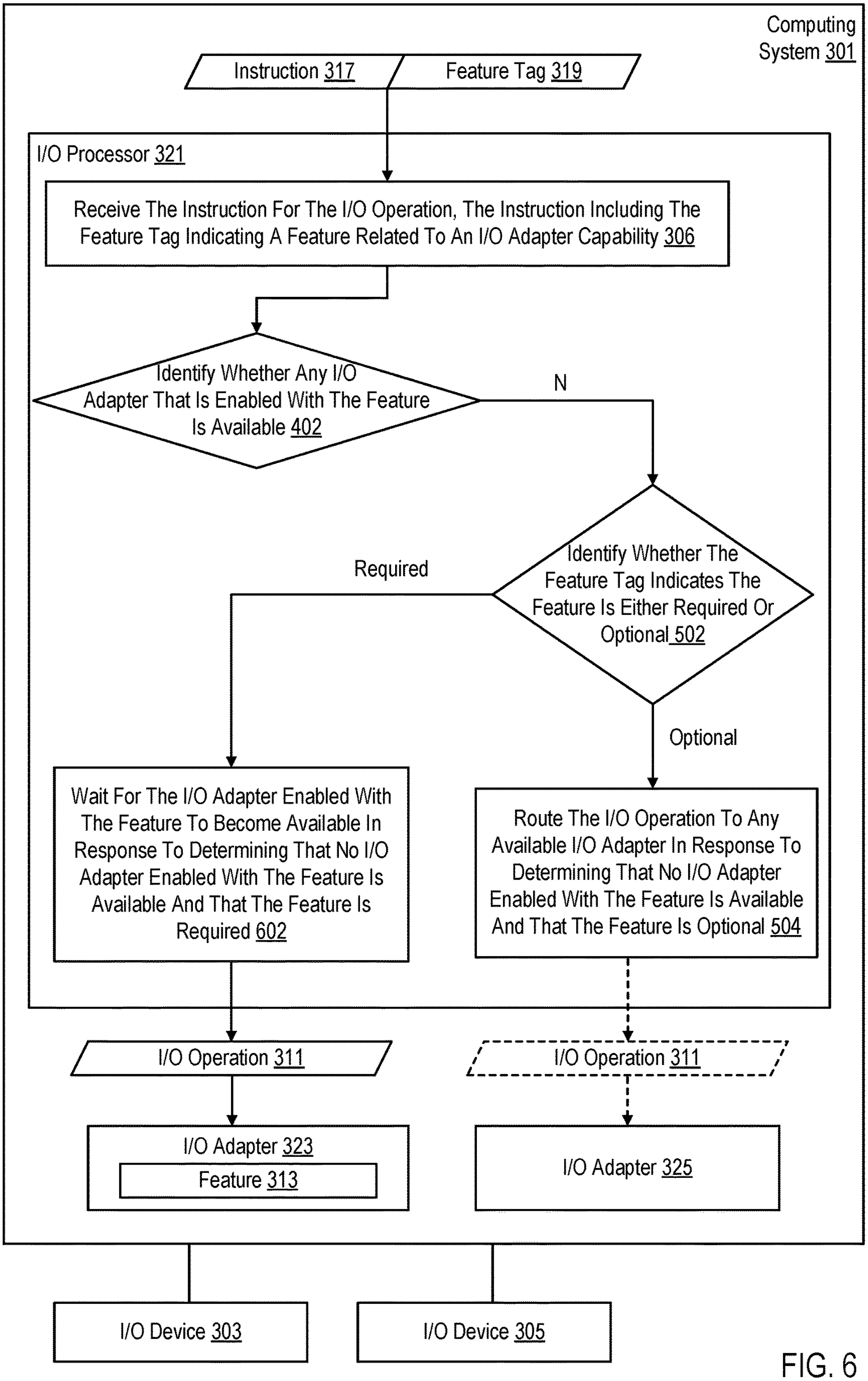
FIG. 6 sets forth a flow chart of an example method of feature management for I/O adapters in accordance with at least one embodiment of the present disclosure.

For further explanation, FIG. 6 sets forth a flow chart of an example method of feature management for I/O adapters in accordance with at least one embodiment of the present disclosure. The method of FIG. 6 extends the method of FIG. 5 in that the method of FIG. 6 also includes waiting 602 for an I/O adapter 323 enabled with the feature 313 to become available in response to determining that no I/O adapter enabled with the feature is available and that the feature 313 is required. In some examples, if the feature 313 is a required feature and all I/O adapters enabled with the feature 313 are busy, the I/O processor 321 waits for an I/O adapter enabled with the feature to become available before scheduling the I/O operation 311 on that I/O adapter. In other implementations, the I/O processor 321 routes the I/O operation 311 to an available I/O adapter that is not enabled with the feature 313 and writes a log entry to a system log indicating that the I/O operation 311 was not performed using the requested feature 313.

In view of the foregoing, it will be appreciated that feature management for I/O adapters in accordance with the present disclosure improves the operation of a computing system by allocating I/O adapter resources to I/O operations based on the I/O capabilities required by those I/O operations, and further improves efficiency by retaining the older I/O adapters for performing I/O operations that do not require the enhanced I/O capabilities. In this way, the lifecycle of legacy adapters is extended.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving an instruction for an input/output (I/O) operation, the instruction including a feature tag indicating a feature related to an I/O adapter capability;

routing, based on the feature tag and information describing a plurality of I/O adapters, the I/O operation to an I/O adapter enabled with the feature when the I/O adapter is available; and routing the I/O operation to any available I/O adapter when no I/O adapter enabled with the feature is available and when the feature is optional.

2. The method of claim 1, wherein the feature tag indicates the feature is one of required and optional.

3. The method of claim 1, wherein one or more of the plurality of I/O adapters is not enabled with the feature.

4. The method of claim 1, wherein the feature tag is identified from a bit mask.

5. The method of claim 1, wherein the feature tag includes a pointer to an entry in a list of I/O adapter features.

6. The method of claim 1, wherein the information describing the plurality of I/O adapters identifies respective capabilities of the plurality of I/O adapters.

7. The method of claim 1, wherein the feature is one of a security feature, an artificial intelligence feature, a compression feature, and a connectivity feature.

8. The method of claim 1, wherein receiving the instruction for the I/O operation and routing the I/O operation are performed by a hardware I/O processor that is distinct from a hardware processor executing an application that initiated the I/O operation.

9. The method of claim 1 further comprising:

performing, by the I/O adapter, the I/O operation using the feature.

10. The method of claim 1 further comprising:

determining, by an operating system, a feature associated with the I/O operation; and issuing, by the operating system based on the feature, the instruction including the feature tag to an I/O processor.

11. The method of claim 1 further comprising:

identifying whether any I/O adapter that is enabled with the feature is available; and wherein routing the I/O operation to an I/O adapter enabled with the feature includes:

routing, in response to determining that at least one I/O adapter enabled with the feature is available, the I/O operation to an available I/O adapter that is enabled with the feature.

12. The method of claim 11 further comprising:

identifying whether the feature tag indicates the feature is either required or optional; and routing the I/O operation to any available I/O adapter in response to determining that no I/O adapter enabled with the feature is available and that the feature is optional.

13. The method of claim 12 further comprising:

waiting for the I/O adapter enabled with the feature to become available in response to determining that no I/O adapter enabled with the feature is available and that the feature is required.

14. An apparatus comprising:

a processing device; and memory operatively coupled to the processing device, wherein the memory stores computer program instructions that, when executed, cause the processing device to:

receive an instruction for an input/output (I/O) operation, the instruction including a feature tag indicating a feature related to an I/O adapter capability;

route, based on the feature tag and information describing a plurality of I/O adapters, the I/O operation to an I/O adapter enabled with the feature when the I/O adapter is available; and route the I/O operation to any available I/O adapter when no I/O adapter enabled with the feature is available and when the feature is optional.

15. The apparatus of claim 14, wherein the computer program instructions, when executed, cause the processing device to:

identify whether any I/O adapter that is enabled with the feature is available; and wherein to route the I/O operation to an I/O adapter enabled with the feature, the computer program instructions, when executed, cause the processing device to:

route, in response to determining that at least one I/O adapter enabled with the feature is available, the I/O operation to an available I/O adapter that is enabled with the feature.

16. The apparatus of claim 15 wherein the computer program instructions, when executed, cause the processing device to:

identify whether the feature tag indicates the feature is either required or optional; and route the I/O operation to any available I/O adapter in response to determining that no I/O adapter enabled with the feature is available and that the feature is optional.

17. A system comprising:

a plurality of input/output (I/O) adapters; and an I/O processing device configured to:

receive an instruction for an I/O operation, the instruction including a feature tag indicating a feature related to an I/O adapter capability;

route, based on the feature tag and information describing the plurality of I/O adapters, the I/O operation to an I/O adapter enabled with the feature when the I/O adapter is available; and route the I/O operation to any available I/O adapter when no I/O adapter enabled with the feature is available and when the feature is optional.

18. The system of claim 17, wherein the I/O processing device is configured to:

identify whether any I/O adapter that is enabled with the feature is available; and wherein to route the I/O operation to an I/O adapter enabled with the feature, the processing device is configured to:

route, in response to determining that at least one I/O adapter enabled with the feature is available, the I/O operation to an available I/O adapter that is enabled with the feature.

19. The system of claim 18 wherein the I/O processing device is configured to:

identify whether the feature tag indicates the feature is either required or optional; and route the I/O operation to any available I/O adapter in response to determining that no I/O adapter enabled with the feature is available and that the feature is optional.

20. The system of claim 19, wherein the I/O processing device is configured to:

write a log entry to a system log indicating that the I/O operation was not performed using the feature in response to determining that no I/O adapter enabled with the feature is available and that the feature is required.

* * * * *